US009525616B2

(12) United States Patent
Roessler et al.

(10) Patent No.: US 9,525,616 B2
(45) Date of Patent: Dec. 20, 2016

(54) METHOD OF PROMOTING A QUICK DATA FLOW OF DATA PACKETS IN A COMMUNICATION NETWORK, COMMUNICATION NETWORK AND DATA PROCESSING UNIT

(71) Applicant: Alcatel-Lucent, Paris (FR)

(72) Inventors: Horst Roessler, Filderstadt (DE); Heidrun Grob-Lipski, Starzach (DE)

(73) Assignee: Alcatel Lucent, Boulogne-Billancourt (FR)

( * ) Notice: Subject to any disclaimer, the term of this patent is extended or adjusted under 35 U.S.C. 154(b) by 139 days.

(21) Appl. No.: 14/349,203

(22) PCT Filed: Oct. 2, 2012

(86) PCT No.: PCT/EP2012/069422
§ 371 (c)(1),
(2) Date: Apr. 2, 2014

(87) PCT Pub. No.: WO2013/075874
PCT Pub. Date: May 30, 2013

(65) Prior Publication Data
US 2014/0294011 A1    Oct. 2, 2014

(30) Foreign Application Priority Data

Nov. 25, 2011   (EP) .................................... 11290539

(51) Int. Cl.
*H04L 12/715*    (2013.01)
(52) U.S. Cl.
CPC .................................... *H04L 45/04* (2013.01)

(58) Field of Classification Search
CPC ........ H04L 45/00; H04L 45/02; H04L 45/021; H04L 45/028; H04L 45/04; H04L 45/08; H04L 45/10
See application file for complete search history.

(56) References Cited

U.S. PATENT DOCUMENTS 5,684,800 A    11/1997  Dobbins et al.
5,825,772 A    10/1998  Dobbins et al.
(Continued)

FOREIGN PATENT DOCUMENTS

JP    2010199882 A    9/2010
JP    2011101245 A    5/2011
(Continued)

OTHER PUBLICATIONS

International Search Report PCT/ISA/210 for International Application No. PCT/EP2012/069422 Dated Oct. 24, 2012.
(Continued)

*Primary Examiner* — Chi H Pham
*Assistant Examiner* — Weibin Huang
(74) *Attorney, Agent, or Firm* — Harness, Dickey & Pierce, P.L.C.

(57) ABSTRACT

In a communication network including a plurality of network domains in which switches and controllers are separated, in controllers providing the information to which neighbor switches are to forward data packets, inter-domain communication is introduced. For example, a local controller alerts another local controller enabling this other local controller to perform process steps in preparation of arrival of a data packet prior to that data packet arriving at its network domain.

16 Claims, 2 Drawing Sheets

(56) References Cited

U.S. PATENT DOCUMENTS

| | | | |
|---|---|---|---|
| 5,946,308 | A | 8/1999 | Dobbins et al. |
| 6,147,995 | A | 11/2000 | Dobbins et al. |
| 2005/0068968 | A1 | 3/2005 | Ovadia et al. |
| 2005/0083949 | A1* | 4/2005 | Dobbins ............ H04L 12/1886 370/395.53 |
| 2006/0050719 | A1 | 3/2006 | Barr et al. |
| 2006/0262786 | A1 | 11/2006 | Shimizu et al. |
| 2010/0166001 | A1 | 7/2010 | Uttaro et al. |
| 2010/0177778 | A1 | 7/2010 | Dobbins et al. |
| 2010/0182934 | A1 | 7/2010 | Dobbins et al. |
| 2011/0235545 | A1 | 9/2011 | Subramanian et al. |
| 2011/0280250 | A1* | 11/2011 | Inoue ...................... H04L 45/54 370/401 |

FOREIGN PATENT DOCUMENTS

| | | |
|---|---|---|
| JP | 2011160301 A | 8/2011 |
| JP | 2011166704 A | 8/2011 |

OTHER PUBLICATIONS

Written Opinion of the International Searching Authority PCT/ISA/237 for International Application No. PCT/EP2012/069422.

McKeown, Nick, et al., "OpenFlow: Enabling Innovation in Campus Networks," ACM SIGCOMM Computer Communication Review, vol. 38, No. 2, pp. 69 to 74, 2008.

Ehab Al-Shaer and Saeed Al-Haj, FlowChecker: Configuration analysis and verification of federated OpenFlow infrastructures, Proceedings of the 3rd ACM workshop on Assurable and usable secruity configuration, ACM, 2010.

Amin Tootoonchian et al.: Hyperflow: a distributed control plane for OpenFlow, INM/WREN'10 Proceedings of the 2010 Internet Network Management Conference on Research on Enterprise Networking; San Jose, CA; Apr. 27, 2010, USENIX Association, Berkeley, USA; XP002698525.

"Openflow Switch Specification Version 1.1.0 implemented"; Internet citation; Feb. 28, 2011; XP 008166938.

Temu Koponen et al. :"Onix: A Distributed Control Platform for Large-scale Production Networks", USENIX, Sep. 23, 2010; XP061010918.

* cited by examiner

METHOD OF PROMOTING A QUICK DATA FLOW OF DATA PACKETS IN A COMMUNICATION NETWORK, COMMUNICATION NETWORK AND DATA PROCESSING UNIT

This application is the national phase under 35 U.S.C. §371 of PCT International Application No. PCT/EP2012/069422 which has an International filing date of Oct. 2, 2012, which claims priority to European patent application number 11290539.3 filed Nov. 25, 2011; the entire contents of each of which are hereby incorporated by reference.

FIELD OF THE INVENTION

The present application relates to a method of promoting a quick data flow of groups of data packets in a network, said network comprising a plurality of network domains, wherefrom each network domain comprises a plurality of network elements of a first class, each serving as a switch, and at least one network element of a second class, each serving as a controller.

The invention also relates to a communication network comprising a plurality of network domains, each network domain comprising a plurality of switches and at least one controller.

Moreover, the present invention relates to two kinds of data processing units programmed to act as a controller in a communication network.

BACKGROUND OF THE INVENTION

The present invention is related to a network or a method in a network, the basic conception of which consists in providing processing units as network elements which may be divided into two classes, with the network elements of the first class having a role in the routing of data packets in a network different from the role of the network elements of the second class. The network elements of the first class may be called switches and have the task of routing data packets, i.e. forwarding the same to a neighbouring switch, which is a switch directly connected to a respective switch via a communication line. The switches, however, do not themselves define to which neighbour switch the data packets are to be sent. Rather, they make use of a flow information data base (or forward information data base), e.g. in the form of a flow table providing to a plurality of addresses which might be contained in a header of a data packet in a group of data packets the information about that neighbour switch to which the data packet having the respective address in its header is to be sent. With the switches making use of these flow information data bases, the network elements of the second class, the controllers, are responsible for providing the information or data comprised in the information data base.

In the network, the switches need to be connected to neighbour switches in order to obtain a network of switches. For each switch there might be provided a controller which is connected thereto via a communication line which might be different from those communication lines by which the switches are connected. Moreover, different controllers may be connected to each other via further communication lines which might be different from other communication lines in the network. For example, communication lines may differ from each other by different protocols being needed when communicating via these communication lines.

When routing data packets, or groups of data packets, there might be the need to make sure the routing takes place quickly enough. For example, if the groups of data packets represent audio or video data to be sent via the network, each delay in the flow of data has to be avoided. There is therefore the need to make sure that at least a particular kind of data packets arrives as quickly as possible or at least with a minimum velocity at the end device corresponding to the address to which the groups of data packets are sent.

SUMMARY OF THE INVENTION

It is therefore an object of the invention to provide a method of promoting a quick data flow of groups of data packets in a network having at least some of the features described above. It is a further object of the invention to provide a network in which such a method is made use of or performed. A further object consists in providing a network element in form of a data processing unit which may be used in order to make a quick data flow of groups of data packets possible.

The present invention is solved according to a first aspect of the invention by a method of promoting a quick data flow of groups of data packets in a (communication) network, that network comprising a plurality of network domains. Each network domain comprises a plurality of network elements of a first class, each serving as a switch, and at least one network element of a second class, each serving as controller, said switches adapted to receive data packets and to forward the same to a respective neighbour switch (connected to the respective switch) which is determined by using entries in a flow information data base stored in the forwarding switch (i.e. that switch which is to forward the data packets it receives) and wherein said controllers are adapted to create such a flow information data base and to forward the same to at least one switch. The method comprises the steps of receiving a first data packet of a group of data packets by a switch in the first network domain, extracting, by the first switch, (at least) address information from the first data packet (namely a header thereof) specifying to which network element of the network the data packet has to be sent, and if to that address information, no entry in a flow information data base exists, forwarding the first data packet to a first controller of the first network domain and extracting by the first controller, (at least) the address information from the data packet (namely its header). The method further comprises the steps of determining at least a second controller outside of the first network domain, which might or will, according to a first determined criterion, be involved with the further forwarding of a group of data packets at a later stage and of forwarding alerting data to the second controller, said alerting data being such data which provide the address information or information derived therefrom, thereby enabling the second controller to perform process steps prior to arrival of the first data packet at the second network domain.

The present invention introduces inter alia the concept of inter-domain communication when routing data in a network of several network domains. By alerting controllers outside of the domain in which the data packets are presently forwarded and routed, these different controllers might perform process steps prior to arrival of the first data packet in such a manner as to prepare this second network domain for future routing of those data packets presently forwarded in the first network domain, and this preparation might be of such kind as to at least enable the network elements in the second network domain to route and forward the group of data packets quicklier than if the alerting data had not been sent. Hence, at least if desired, less time will be consumed for the routing of the data packets.

In a preferred embodiment of the present method, the first controller determines by using the address information a path of connected switches in the first network domain to be travelled through by the group of data packets, and determines as well a switch in a second network domain to which the data packets are to be sent from the switch in the first domain. When performing both the path determination and the forwarding of alerting data, the first controller may compute the data very efficiently.

In order to be able to determine a path, the first controller might use, further to the address information in the form of a numerical address, label or name, source information, i.e. information from where the data packets come from, it might further use bandwidth and other Quality of Service parameters, resources, shared risk link groups to use or to avoid, the number of disjoint paths required and whether near-disjoint paths are acceptable, the levels of resiliency, reliability and robustness of the path resources and policy-related information.

Preferably, the first controller creates a flow data base or at least an entry thereof on the basis of the determined path and sends it to at least some of those switches which are part of the path. In order to enable forwarding of the first data packet along the path, the first controller further sends the first data packet back to the first switch or to a further switch of the path with this first or further switch being enabled, by having received the flow information database, to determine to which neighbour switch the data packet is to be forwarded. The flow data base might be any type of collection of data in any kind of storage means. Preferably, a flow table is used as a flow data base.

Further preferably, the first controller sends the alerting data to a controller of the second network domain as a second controller. In this particular embodiment, it proves to be very efficient that the same first controller forwards the alerting data which determines the path: since the first controller determines the switch in a second network domain to which the data packets are to be sent from the first network domain, the first controller knows via the path to which second network domain the alerting data is to be sent, i.e. to which second controller the alerting data is to be sent.

In a further embodiment to be performed as an alternative to the aforementioned embodiment, or in addition thereto, the first controller sends the alerting data to master controller, said master controller determining at least one second or third network domain by switches of which the group of data packets is to be forwarded according to a second predetermined criterion. The master controller sends the received alerting data or other alerting data derived therefrom to a second controller of a second network domain and/or of a third network domain. The second network domain can be identical to that identified by the first controller. The third network domain may be different from the second network domain determined to be part of the path by the first controller.

In a preferred embodiment of the invention, that controller which receives the alerting data (the second controller of a second network domain and/or of a third network domain) determines, from the alerting data, a path of connected switches in its domain to be travelled through by the group of data packets, creates at least an entry in a flow information database, e.g. a flow table on the basis of the determined path and sends it to at least some of those of the switches which are part of the path. In other words, the second controllers preferably basically performs the same steps as the first controller for forwarding the data packets (besides possibly of the forwarding of alerting information). The difference, however lies in that the second controller did not receive itself the data packet from one of the switches of its network domain. Rather, the second controller received the alerting data providing the same or similar information which the second controller might have extracted from such data packets.

In an alternative to directly determining the path, the second controller of the second network domain or that of a third network domain forwards upon receipt of the alerting data a request to at least a second switch, said request relating to the existence of an entry in a flow information data base stored in said second switch with regard to a specific address information extracted from or defined on the basis of the alerting data, and said second switch sends back information whether or not such an entry exists to the second controller. Only if no such entry exists, the second controller has to create (at least) an entry in a flow information data base on the basis of the determined path and sends it to at least some of those switches which are part of the path.

In this alternative, the second controller never determines the path in vain, but only if this is really needed. This might sometimes be more efficient as to calculation time of the second controller. On the other hand, the alternative of directly determining the path without knowing about whether or not an entry in a flow information data base exists with regard to the specific address might be less time-consuming.

In a preferred embodiment of the present invention, if to the address information extracted by the first switch an entry in a flow information data base (such as a flow table) exists indicating a neighbour switch to which the first switch is connected, the first switch forwards the first data packet and/or data packets of the same group of data packets to that neighbour switch. In this case, the forwarding does not take place (since the first data packet will not be sent to the first controller).

In a preferred embodiment of the present method, the first controller extracts supplemental data (further to the address data) from the first data packet, such as bandwidth and other Quality of Service parameters, resources, shared risk link groups to use or to avoid, the number of disjoint paths required and whether near-disjoint paths are acceptable, the levels of resiliency, reliability and robustness of the path resources and policy related information. This supplemental data might be used when a) determining the controller outside of the first network domain (to which the alerting data is to be forwarded), when b) determining a path, and/or c) when defining the alerting data.

The presented method of promoting a quick data flow of groups of data packets in a network becomes a method of routing groups of data packets in a communication networks as soon as any step of forwarding such data packets from one switch to a neighbour switch connected thereto is performed. Therefore some of the preferred embodiments of the present invention relate to such a method of routing of data packets in a network, such as e.g. a telecommunication network or the internet.

According to a second aspect of the present invention, a network comprising a plurality of network domains is provided, each network domain comprising a plurality of switches and at least one controller, said switches adapted to receive and forward data packets by using flow information data bases, and said controllers adapted to receive data packets from switches to extract the data providing at least an address information from the data packets, and further to create entries in information data bases by using the extracted data, and to send these entries to the switches. Furthermore, at least one of the controllers in the first network domain is adapted to forward extracted data and/or data provided on the basis of the extracted data to a controller outside of the first network domain.

Once again, the present invention when relating to the communication network introduces the conception of inter-domain communication for the purpose of enhancing the routing velocity in the network. The term "adapted to" might be construed to relating to a data processing unit acting as switch or controller, which is programmed in a particular manner such as to perform the particular steps. If a plurality of steps is named, one might interpret that in such a manner that a computer program has different software modules, each software module being responsible for performance of each one of the steps.

For example, the controllers adapted to receive data packets and to extract data and further to create entries in flow information data bases and to send these entries to the switches might be interpreted as comprising a request processing entity adapted for receiving requests coming from the switches and adapted for performing processing of these requests; a path computation entity adapted for computing a network path upon request from the request processing entity, based on a network graph and applying constraints; a flow control entity adapted for establishing a forwarding or flow entry in the forwarding/flow information data base of a switch of a computed network path, upon request from the request processing entity. The path computation entity might be further linked with a graphic engineering data base which is updated with the computed network paths and other resources.

If one of the controllers in the first network domain is adapted to forward extracted data and/or data provided on the basis of the extracted data, this might be construed as to the controller, as a data processing unit, being programmed in such a manner as to comprise a software module responsible for determining a second controller outside the first network domain to which to send the extracted data, and for causing sending of these extracted data to that second controller. The software module might also comprise a module creating data for use by the second controller on the basis of extracted data.

As an alternative to software modules mentioned above, dedicated hardware components may do as well.

The controllers and/or switches might be individual data processing units in the form of "processors". These functions may be provided by single dedicated processor, by single shared processor or by a plurality of individual processors, some of which may be shared. Moreover, explicit use of the term "processor" or "controller" should not be construed to refer exclusively to hardware capable of executing software, and may implicitly include, without limitation, digital signal processor, hardware, network processor, application specific integrated circuit, field programmable gate array, read only memory for storing software, random access memory and non-volatile storage. Other hardware, conventional and/or custom may also be included.

In a preferred embodiment of the communication network, the controller in the first domain is adapted to forward extracted data and/or data provided on the basis of extracted data to the second controller in a second domain, said second controller being adapted to create at least an entry in a flow information data base on the basis of data forwarded by the first controller. In that aspect, the communication network serves for providing for a quicker routing of data packets, or groups of data packets, in the network since the second controller does not need to receive the data packet itself but rather receives only the data from the controller in the first network domain replacing the receipt of the data packet. The creating of an entry in a flow information data base is or may be a process step prior to the arrival of the first data packet of a group of data packets at the second network domain.

Preferably, the communication network comprises a master controller, wherein the controller in the first domain is adapted as a first controller to forward extracted data and/or data provided on the basis of extracted data to the master controller, and said master controller is adapted to determine, according to a specific predetermined criterion, a further network domain different from the first domain on the basis of data received from the first controller and to forward the data received from the first controller or data derived therefrom to a controller in the further network domain. In that preferred embodiment, the conception of a master controller provided in the communication network is introduced. The master controller may itself determine or compute a path to be travelled through by the data packets, or determine a further network domain otherwise which might, or at least will be according to commands from the master controller, be involved in the routing of the data packets.

The master controller may be one of the controllers responsible for a network domain. In this case, one network domain has, as to its controller, a higher responsibility than the other network domains. The network domain with the master controller might somehow be the "master network domain". Such a hierarchical structure might be expedient in some cases. As an alternative thereto, the master controller may be provided outside of all network domains separately. In this case, the equality of all network domains might be ensured, at the cost of having to provide a separate master controller. Such separate master controller might, however, be tailor-made to the particular tasks it has to perform in the form of a suitable data processing unit.

In a further, third aspect of the present invention, a data processing unit is provided, which is programmed to act as a controller in a communication network, wherein said communication network comprises a plurality of network domains, each network domain comprising a plurality of switches and at least one controller, said controller in the network adapted to receive data packets from switches to extract at least address information from the data packet, to create entries in flow information databases enabling switches to determine neighbour switches to which to forward received data packets. When acting as such a controller, the data processing unit is necessarily programmed to extract at least address information from data packets received from a switch. Furthermore, the data processing unit is further programmed to forward data extracted from a data packet and/or data provided on the basis of such extracted data to another processing unit programmed to act as controller and coupled to the data processing unit.

The data processing unit may be programmed by use of the particular software-modules mentioned above when describing the communication network. In the present third aspect of the invention, it is clear that an individual controller may contribute to enhancing the velocity of routing of groups of data packets in a network.

In a fourth, further aspect of the present invention, a data processing unit is provided programmed to act as a controller in a communication network, wherein said communication network comprises a plurality of network domains, each network domain comprising a plurality of switches and at least one controller, the data processing unit being programmed to create entries in flow information databases. The data processing unit is further programmed to receive data from an other processing unit programmed to act as a controller and coupled to the data processing unit, and to create the entries in flow information databases on the basis of such received data.

The data processing unit according to the fourth aspect of the present invention might further to the explicitly named features include features that it is programmed to receive data packets from switches to extract at least address information from these data packets and to create entries in flow information databases enabling switches to determine neighbour switches to which to forward received data packets on the basis of such extracted at least address information.

The data processing unit according to the fourth aspect of the present invention can be used in a network in order to enhance the velocity of routing of groups of data packets in a communication network. This is in particular at least true if at the same time a data processing unit according to the third aspect of the invention is provided in the network, such data processing unit according to the third aspect of the invention forwarding data extracted from a data packet and/or data provided on the basis of such extracted data to the processing unit according to the fourth aspect of the invention, thereby enabling the processing unit according to the fourth aspect of the invention to create entries in flow information databases on the basis of those data received from the data processing unit according to the third aspect of the invention.

When speaking about determining of flow information databases by use of path computation, the data processing unit might comprise path computation entities, preferably as defined in RFC4655, see http://tools.ietf.org/html//rfc4655, available via the internet on at least Nov. 14, 2011. The data processing unit might comprise a request processing entity adapted to communicate with the path computation element through a path computation protocol, as defined in RFC5440, see http://tools.ietf.org/html//rfc5440, also available at least on Nov. 14, 2011 via the internet. The path computation element may be linked with the central traffic engineering database storing current resource and traffic information which is updated centrally, and there is no need for having a local traffic engineering database in the network elements, i.e. in the data processing units. The operation of the traffic engineering database is explained in more detail in RFC4655, as mentioned above, and in the IETF internet draft entitled "Traffic Engineering Database Management Information Base and Support of GMPLS", see http://tools.ietf.org/html/draft-ietf-ccamp-gmpls-ted-mib-01.

The request processing entity comprises a resource reservation protocol instance, with the respective protocol being defined in RFC46205, see https://datatrecker.ietf.org/doc/rfc2205.

The traffic engineering database may comprise a Generalised Multi-Protocol Label Switching (GMPLS) instance. In that way, cross-technology routers do not need to have the GMPLS function inside their router.

According to a preferred embodiment, a request processing entity in the data processing unit is further adapted for receiving and interpreting path control computation element protocol messages and/or OpenFlow protocol messages from network elements. In that way, backward compatibility with the existing network elements having a path computation element client on OpenFlow client is guaranteed.

DESCRIPTION OF THE FIGURES

The accompanying drawings are used to illustrate presently preferred non-limiting exemplary embodiments of the present invention. The above and other advantages, features and objects of the invention will become apparent, and the invention will be better understood from the following detailed description when read in conjunction with the accompanying drawings in which.

Figure 1:
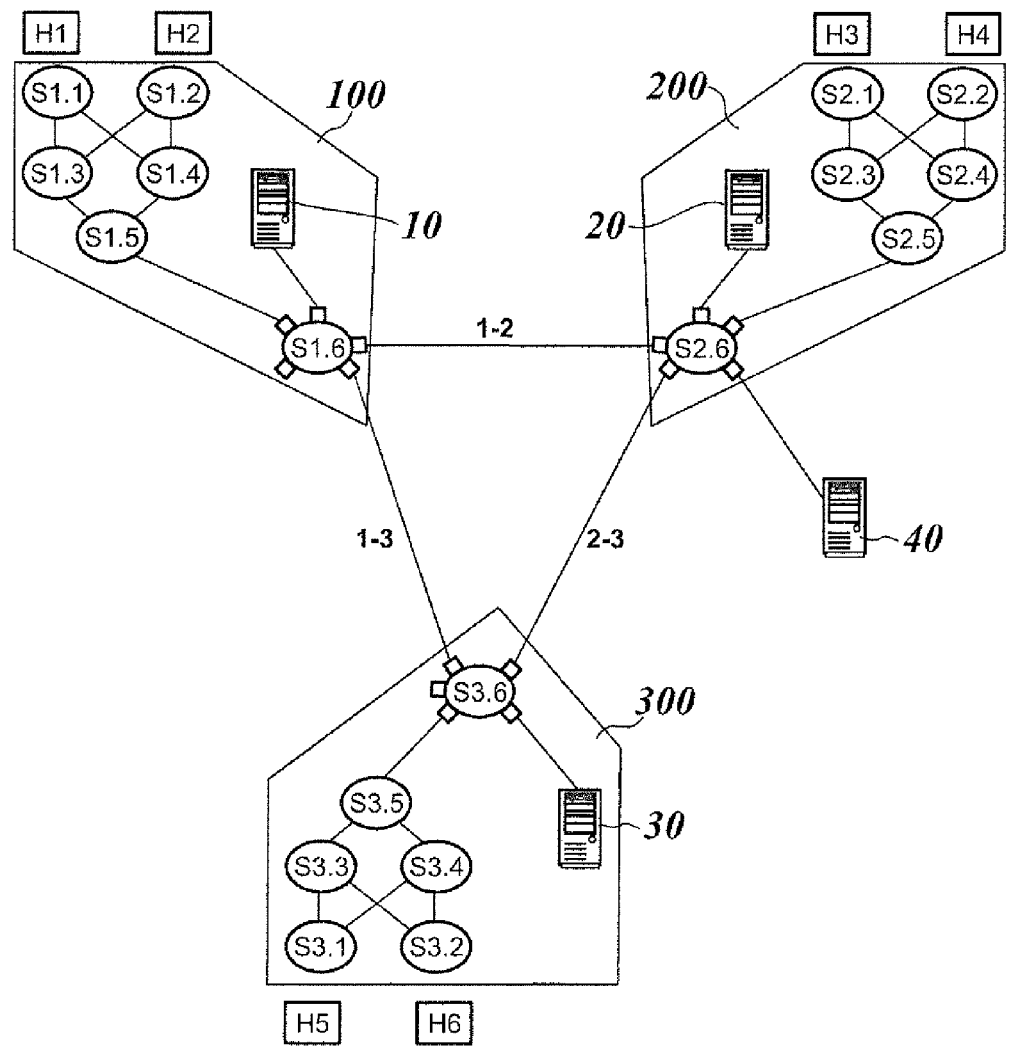
FIG. 1 is a schematic view of a communication network provided according to an embodiment of the present invention and enabling the performance of a method according to a preferred embodiment of the present invention.

A communication network serves for communication between individual hosts H1, H2, H3, H4, H5, H6. The network comprises individual network domains 100, 200, 300. Each network domain comprises a plurality of switches and one (local) controller:

The first network domain 100 comprises switches S1.1, S1.2, S1.3, S1.4, S1.5 and S1.6 connected with at least one neighbour switch of these each. Connected with all switches S1.1, S1.2, S1.3, S1.4, S1.5 and S1.6 is the local controller 10 (connecting lines not shown). The switches S1.1 and S1.2 are coupled to host H1 and H2, respectively. Switch S1.6 is of particular importance since this switch is connected to the other network domains 200 and 300.

The network domain 200 comprises switches S2.1, S2.2, S2.3, S2.4, S2.5 and S2.6 connected with at least one neighbour switch of these each. Connected with all switches S2.1, S2.2, S2.3, S2.4, S2.5 and S2.6 is the local controller 20 (connecting lines not shown). The switches S2.1 and S2.2 are coupled to host H3 and H4, respectively. Of particular importance is switch S2.6 which is connected via communication line 1-2 to switch S1.6 of the first network domain 100 and to network domain 300.

The network domain 300 comprises switches S3.1, S3.2, S3.3, S3.4, S3.5 and S3.6 connected with at least one neighbour switch of these each. Connected with all switches S3.1, S3.2, S3.3, S3.4, S3.5 and S3.6 is the local controller 30 (connecting lines not shown). The switches S3.1 and S3.2 are coupled to host H5 and H6, respectively. Of particular importance is switch S3.6 which is connected to both switches S1.6 of the first network domain 100 and switch S2.6 of the network domain 200 via communication lines 1-3 and 2-3, respectively.

With each network domain 100, 200, 300 having its local controller 10, 20, 30, all of these local controllers are coupled via specific communication lines not shown in the Figure; and furthermore, there is a further controller 40, which may be called a "master controller" which is also coupled to all of the local controllers 10, 20, 30 via communication lines not shown in FIG. 1.

In the following, a method according to a preferred embodiment of the invention is discussed with respect to FIG. 2:

In the present case, we discuss the situation in which the host H1 sends a group of data packets to the host H6.

Figure 2:
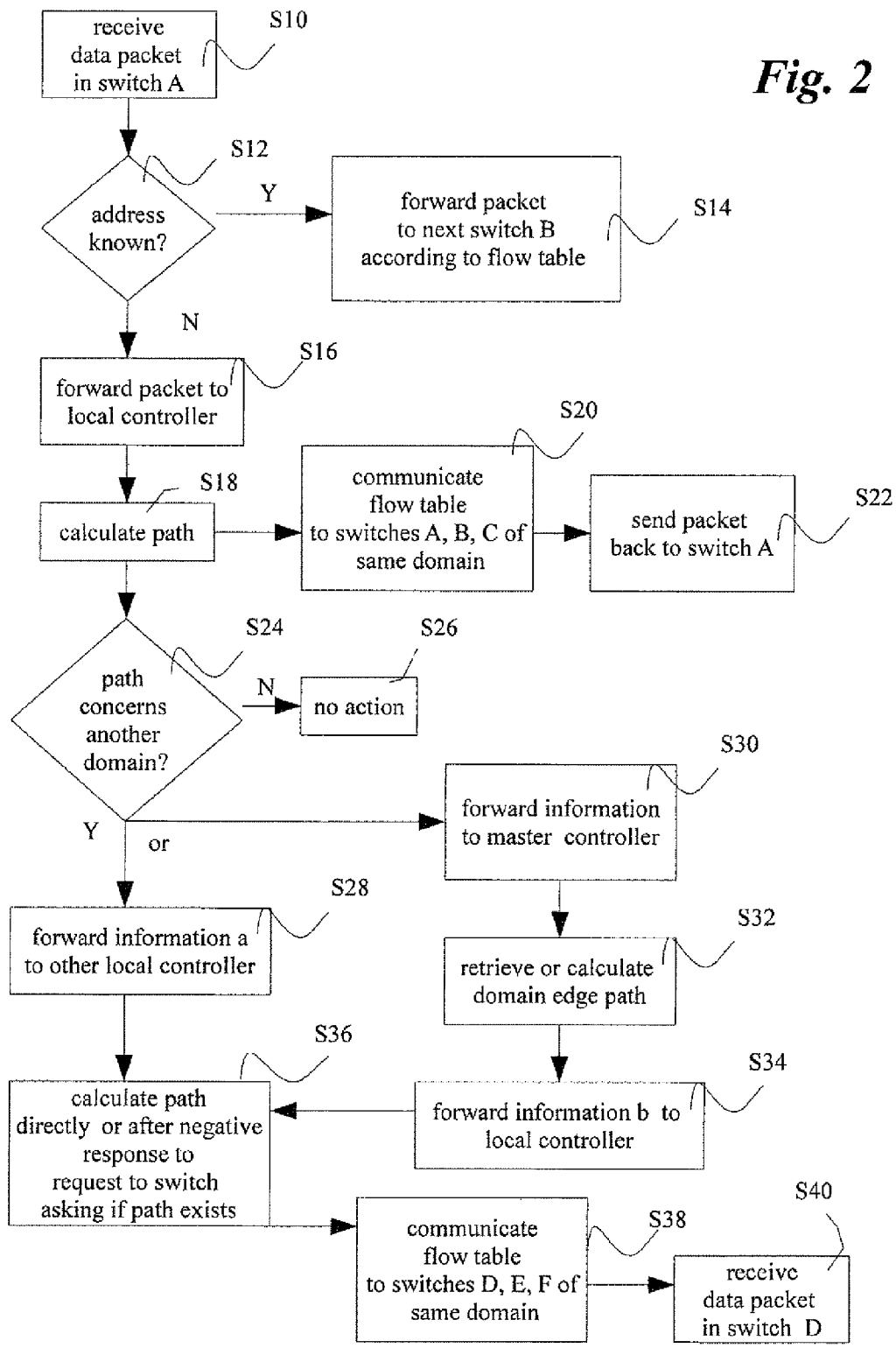
FIG. 2 is a flow diagram illustrating the individual steps of a method according to an embodiment of the invention in two alternatives.

The first switch coupled to host H1 is switch S1.1 and receives, in steps S10 a data packet (at least the first data packet) from the host H1 (in FIG. 2, for being more general, the receiving switch is called "switch A". In the present example "switch A" might be replaced by "S1.1").

The switch S1.1 now checks, in step S12, whether the data packet comprises an address, typically in a header thereof, which is known. By the known address, such an address is meant to which an entry in a flow table stored in switch S1.1 exists.

The answer may be positive because in the past, several data packets might have been routed from host H1 to host H6 and the address is that of host H6 with switch S3.2. The switch S1.1 would therefore be able to forward the data packet to the next switch according to the entry in the flow table, see step S14. The next switch B might be switch S1.3 or switch S1.4, depending on what the flow table specifies.

It might be, however, that at least in the last cycle in which data entries in the flow table were maintained in the storage means of the switches, no data packet has been sent from switch S1.1 with host H1 to switch S3.2 with host H6 such that the address is not (or no longer, after deletion) known. In that case, the switch S1.1 forwards the data packet to its local controller 10 in step S16. The local controller 10 will, in a well-known manner known for example from Open Flow network conceptions, be able to calculate the path. In the present case, the path may start with S1.1, S1.3, S1.5, S1.6 or alternatively with S1.1, S1.4, S1.5, S1.6, and will be continued with S3.6, with the further switches not known to local controller 10.

As to the path portion in the first network domain 100, in the present case the local controller 10 might recognise from supplemental data in the header of the first data packet that the group of data packets from the host H1 needs a quick routing and will therefore prefer switch S1.4 to switch S1.3, with switch S1.4 being for example more performant. In step S20, the local controller 10 will therefore communicate a flow table (entirely new) or at least entries thereof to the switches of the first network domain 100. The entry in the flow table for switches S1.1 will specify that the packet having the address of switch S.3.2/host H6 is to be forwarded to switch S1.4. The flow table for switch S1.4 will now specify that the data packet having the address of switch S3.2/host H6 will have to be forwarded to switch S1.5. The new flow table for switch S1.5 will specify that the data packets having the address of switch S3.2/host H6 is to be forwarded to switch S1.6. The flow table for switch S1.6 will now specify that the data packet having the address of switch S3.2/host H6 is to be forwarded to switch S3.6 of the second network domain 300.

Further to communicating the flow table in step S20, the local controller 10 will send the packet, which is now to be forwarded, back to switch A, switch S1.1. Alternatively, it can send the packet to switch A', e.g. one of the other switches responsible for routing the data packets, e.g. to the next switch S1.4.

In a next step S24, it is now checked whether the path calculated by the local controller 10 in the first network domain 100 in step S18 concerns another domain. If this is not the case, no action is necessary (S26). In the present example, the path indeed concerns another domain, namely the second network domain 300. In this case, in a first alternative, the local controller 10 forwards specific information to another local controller, namely the second local controller 30 of the second network domain 300.

The local controller 10 might in particular provide such information to the second local controller 30 enabling the second controller 30 to perform process steps in the second network domain 300 preparing the second network domain 300 for receipt of the data packets.

Usually, the local controller 10 was not able to identify the switches besides switch S.3.6 because different network domains 100, 200, 300 are independent of each other and their topology is in particular not known to the local controllers of other network domains. In step S18 the local controller 10 therefore has calculated the path only as to its own first network domain 100 and including the network element S3.6 known to the local controller 10 without being able to calculate the further path in the second network domain 300. In that case, the information forwarded in step S28 from the local controller 10 to the local controller 30 is of such kind that the local controller 30 may itself calculate a path. For example, simply the information might comprise the address of switch S3.2/H6 from which the local controller 10 only knows it is part of the second network domain 300. Further to address information the local network controller 10 may forward supplemental information such as information on the bandwidth or other information determining the priority by which the group of data packets is to be handled in the communication network. For example, the supplemental information may specify that the data from host H1 is audio or video data and that therefore a quick routing is needed. The local controller 10 may thus forward information to the second local controller 30, or at least forward information that a high priority is attributed to the group of data packets or to the address S3.2/H6, respectively.

As an alternative to forwarding the information to the local controller 30 (or also in addition thereto) the local controller 10 may forward same or similar information as mentioned above with regard to the local controller 30 to the master controller 40. The master controller 40 may retrieve from the address information, or may also calculate, a domain edge path, i.e. will know that for the present address, particular edge switches S1.6, S3.6 are needed. (It may also be that the master controller 40 determines that in the present case, the information flow from switch S1.6 to switch S3.6 may go via switch 2.6 of the third network domain 200.) In any case, the master controller 40 is able to supervise the data flow or routing of a group of data packets in the communication network and cause local controllers 30, 20 to act accordingly in step S34. The master controller 40 therefore forwards information b, which may be of another kind as information a sent in step S28 from the first local controller 10, to a local controller 30 which has been determined by master controller 40. In the present case, the master controller 40 will at least forward information b to the local controller 30 because that group of data packets has to be necessarily routed to the second network domain 300. The master controller 40 may also at the same time forward the information b' to the local controller 20 in case the data were to be routed via the switch S2.6. The master controller 40 would, in the second case, further inform the local controller 10 to cause it to provide a flow table entry to switch S1.6 specifying that the data packet having the address of switch S3.2/host H6 is first to be sent to switch S2.6.

In the following, for simplicity, we only discuss what happens if the information a has been sent in step S28 to the local controller 30 and/or if the information b has been sent to the same local controller 30 of the second network domain 300.

The second controller 30 has received information a or b from the local controller 10 or the master controller 40, respectively, specifying somehow that a data packet is to be expected in the second network domain 300 which is to be routed to switch S3.2/host H6. The local controller 30 will therefore calculate the path in the second network domain 300 and for example calculate that the data packets are to be routed via switches S3.6, S3.5, S3.3, S3.2 to host H6. Alternatively, the local controller 30 may "ask" the switches whether or not a flow table relating to that particular address already exists. Only when having received a negative response to such requests to the switches, it will calculate the path.

Having calculated the path in step S36, the local controller 30 will communicate the flow table needed by the switches to the switches of the same domain. These are particularly the switches S3.6, S3.5, S3.3 and S3.2 (the indication "switches D, E, F" in FIG. 2 represents a finite number of switches). The new flow table for switch S3.6 will specify that the data packet having the address of switch S3.2/host H6 is to be sent to switch S3.5. The new flow table for switch S3.5 will specify that such data packets are to be routed to neighbour switch S3.3. The flow table for switch S3.3 now available will specify that the data packets are to be sent to switch S3.2 if they have the address S3.2/host H6.

The method described above enhances the velocity of the data flow in the network or at least ensures that the velocity is a velocity not lower than desired. In particular, local controllers such as local controller 30 know about data packets before such data packets arrive at the first switch S3.6 of their network domain 300. If the method was not performed, it might be that the address is not included in a flow table of the switch S3.6. In that case, the switch S3.6, when receiving the data packet, would also have to forward the data packet to the local controller 30 in order to enable the local controller 30 to calculate the path. By the present method, in contrast thereto, the local controller 30 is able to start calculation of the path or similar process steps prior to arrival of the data packet at the edge switch S3.6. By this, the data flow is rendered faster, at least if needed.

The present invention is not limited to providing only three network domains but might provide, or be used in connection with, both less and in particular more than three network domains. The inventive method is not limited to an application in a network having a particular number of network domains, provided there are at least two of those present.

While the principles of the invention have been set out above in connection with specific embodiments, it is to be clearly understood that this description is merely made by way of example and not as a limitation of the scope of protection which is determined by the pending claims.

The invention claimed is:

1. A method for promoting data flow of groups of data packets in a network, the network including a plurality of network domains, each of the plurality of network domains including a plurality of network elements of a first class and at least one network element of a second class that is different from the first class, the plurality of network elements of the first class is a plurality of switches and the at least one network element of the second class is a host controller, at least one of the plurality of switches configured to receive the groups of data packets and forward the groups of data packets to a neighbouring switch of the plurality of switches, the neighbouring switch is determined by exclusively using entries in a flow information database stemming from the host controller and stored in a forwarding switch, the host controller configured to create the flow information database and forward the flow information database to the at least one of the plurality of switches, the method comprising:

receiving a first data packet by a first switch of the plurality of switches in a first network domain of the plurality of network domains;

extracting, by the first switch, address information from the first data packet;

specifying, by the first switch, which one of the plurality of network elements the first data packet is to be sent;

forwarding the first data packet from the first switch of the plurality of switches in the first network domain to the first controller in the first network domain if no main entry with respect to the address information in the flow information database, the first controller configured to forward alerting data to a master controller;

extracting, by the first controller, the address information from the first data packet;

a second controller in a second network domain of the plurality of network domains, according to a first desired criterion, the second controller configured to forward the groups of data packets; and forwarding the alerting data to the second controller, the alerting data including the address information or information derived therefrom, the second controller in the second network domain configured to perform process steps prior to arrival of the first data packet at, wherein the master controller is configured to, determine, according to a second desired criterion, the second network domain or a third network domain of the plurality of network domains based on the alerting data received from the first controller.

2. The method of claim 1, wherein the first controller in the first network domain is further configured to, determine, using the address information, a first path to be traveled by the groups of data packets through the plurality of switches connected to each other in the first network domain, and determine a second switch of the plurality of switches in the second network domain to which the groups of data packets are to be sent from the first switch in the first network domain.

3. The method of claim 2, wherein the first controller in the first network domain is further configured to, create a first entry region in the flow information database based on the determined first path, send the flow information database to the at least one of the plurality of switches which are part of the determined first path, and send the first data packet back to at least one of the first switch of the plurality of switches in the first network domain and the at least one of the plurality of switches in the determined first path.

4. The method of claim 2, wherein the first controller in the first network domain is configured to send the alerting data to the second controller in the second network domain.

5. The method of claim 1, wherein, the master controller is further configured to, send the received alerting data or other alerting data derived therefrom to the second controller in the second network domain or a third controller in the third network domain.

6. The method of claim 4, wherein the second controller in the second network domain or a third controller in a third network domain is configured to, determine, from the alerting data, a second path in the second network domain or the third network domain to be traveled through by the group of data packets through the plurality of switches connected to each other in the second network domain or the third network domain of the plurality of network domains,
create a second entry in the flow information database based on the determined second path in the second network domain or the third network domain, and
sends the second entry to the at least one of the plurality of switches which are part of the determined second path in the second network domain or the third network domain of the plurality of network domains.

7. The method of claim 4, wherein,
the second controller in the second network domain or a third controller in a third network domain is configured to,
   forward, upon receipt of the alerting data, a request to the second switch of the plurality of switches in the second network domain or the third network domain, the request relating to the existence of a second entry in the flow information database stored in the second switch of the plurality of switches in the second network domain or the third network domain with regards to the address information extracted based on the alerting data, and
the second switch of the plurality of switches in the second network domain or the third network domain is configured to,
   send back the address information whether or not the second entry exists to the second controller or the third controller, and if the second entry does not exist, the second controller or the third controller is configured to,
      create the second entry in the flow information database based on the determined first path, and
      send the entry to at least one of the plurality of switches in the second network domain or the third network domain which are part of the determined first path.

8. The method of claim 1, wherein, if a first entry with regards to the address information extracted by the first switch of the plurality of switches in the first network domain exists in the flow information database that indicates the neighbouring switch to which the first switch of the plurality of switches in the first network domain is connected, then the first switch is configured to forward the first data packet and the groups of data packets to the neighbouring switch.

9. The method of claim 1, wherein the first controller in the first network domain is further configured to,
   extract supplemental data from the first data packet,
   determine the second controller or a third controller outside of the first network domain based on the supplemental data,
   determine a path based on the supplemental data, and use the supplemental data when defining the alerting data.

10. A communication network comprising:
a plurality of network domains, each of the plurality of network domains including a plurality of switches and a host controller different from the plurality of switches, the plurality of switches in a first network domain of the plurality of network domains are configured to,
   receive and forward data packets by exclusively using a flow information database stemming from a first controller in the first network domain, the first controller configured to,
      receive the data packets from the plurality of switches in the first network domain,
      extract data from the received data packets, the extracted data provides address information,
      create a first entry in the flow information database based on the extracted data, and
      send the first created entry to the plurality of switches in a first network domain,
      forward the extracted data, according to a first desired criterion, to a second controller outside of the first network domain, and
      forward alerting data to a master controller, the master controller configured to determine, according to a second desired criterion, a second network domain or a third network domain based on the alerting data received from the first controller in the first network domain.

11. The communication network of claim 10, wherein the first controller in the first network domain is further configured to,
   forward the extracted data to the second controller in a second network domain, the second controller configured to create a second entry in the flow information database based on the data forwarded by the first controller.

12. The communication network of claim 10, wherein the master controller is further configured to,
   forward the received alerting data from the first controller in the first network domain to the second controller in the second network domain or a third controller in the third network domain.

13. The communication network of claim 12, wherein the master controller is part of the communication network.

14. The communication network of claim 12, wherein the master controller is provided outside of the first network domain, the second network domain and the third network domain.

15. Data processing circuitry in a communication network, the communication network including a plurality of network domains, each of the plurality of network domains including a plurality of switches and a host controller different from the plurality of switches, the data processing circuitry comprising:
a memory configured to store computer readable instructions; and
a first controller in a first network domain of the plurality of network domains, the first controller configured to execute the computer readable instructions to,
   receive data packets from the plurality of switches in the first network domain of the plurality of network domains,
   extract an address information from the received data packets,
   create a flow information database, the plurality of switches in the first network domain configured to determine at least one of a respective neighbour of the plurality of switches to which the received data packets are forwarded based on the flow information database,
   forward the address information, according to a first desired criterion, extracted from the received data packets to a second data processing circuitry in a second network domain, the second data processing circuitry is a second controller, the second controller is coupled to the first controller, and
   forward alerting data to a master controller,
wherein the master controller is configured to determine, according to a second desired criterion, the second network domain or a third network domain of the plurality of network domains based on the alerting data received from the first controller.

16. A Data processing circuitry in a communication network, the communication network including a plurality of network domains, each of the plurality of network domains including a plurality of switches and a host controller different from the plurality of switches, the data processing circuitry comprising:
- a memory configured to store computer readable instructions; and
- a first controller in a first network domain of the plurality of network domains, the first controller configured to execute the computer readable instructions to,
  - receive data, according to a first desired criterion, from a second controller in a second network domain of the plurality of network domains, the second controller coupled to the first controller,
  - create entries in a flow information database based on the received data from the second controller, and
  - forward alerting data to a master controller,
- wherein the master controller is configured to determine, according to a second desired criterion, the second network domain or a third network domain of the plurality of network domains based on the alerting data received from the first controller.

* * * * *